United States Patent [19]

Murray

[11] 3,748,046

[45] July 24, 1973

[54] MEASUREMENT OF REFLECTION DENSITY

[75] Inventor: James Emmett Murray, University Heights, Ohio

[73] Assignee: Harris-Intertype Corporation, Cleveland, Ohio

[22] Filed: Dec. 13, 1971

[21] Appl. No.: 207,503

[52] U.S. Cl. ............... 356/195, 356/212, 356/179
[51] Int. Cl. ............................................. G01j 3/46
[58] Field of Search ................. 356/179, 195, 212, 356/23

[56] References Cited
UNITED STATES PATENTS 2,968,988  1/1961  Crosfield ........................... 356/173
3,051,841  8/1962  Crosfield ........................... 356/199
3,636,361  1/1972  Bowers .............................. 356/212

Primary Examiner—Ronald L. Wibert
Attorney—J. Herman Yount, Jr.

[57] ABSTRACT

A density measuring system in which light is reflected from part of an image area to measure ink density of ink applied. This light is compared with a reference test patch and the ratio of the light reflected by the test patch is multiplied by another ratio which is the ratio of the light reflected from the test light patch to light reflected from the surface of paper to obtain the indication of ink density.

3 Claims, 3 Drawing Figures

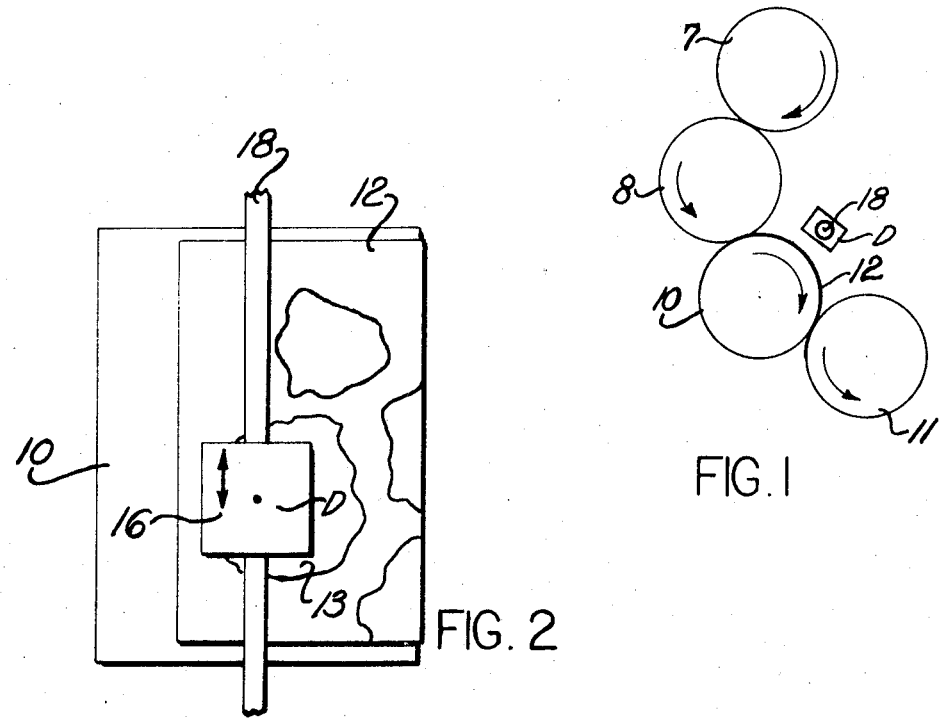
FIG. 1
FIG. 2
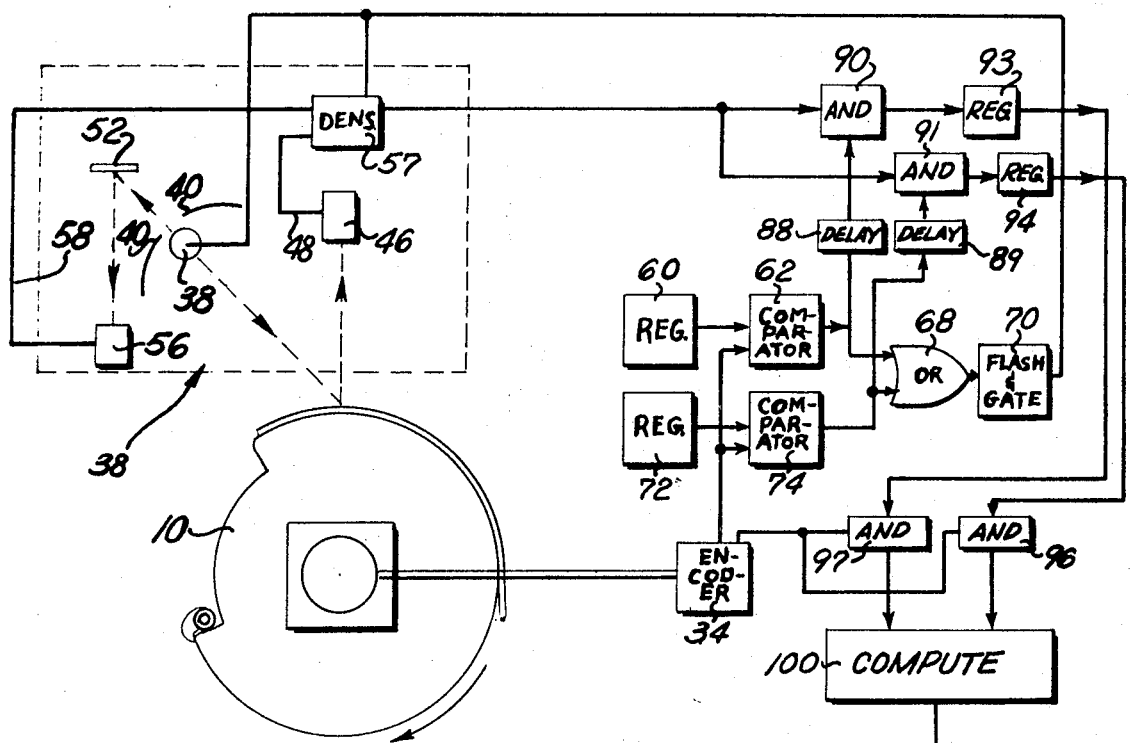
FIG. 3

MEASUREMENT OF REFLECTION DENSITY

The present invention relates to ink density measuring systems and more particularly to such a system for use on a printing press.

It is generally known that the logarithm to the base 10 of the ratio of the amount of light reflected from ink which has been printed on a sheet to the light reflected from the sheet is a measurement of ink density. This ratio has been obtained by printing a color patch of the ink and reflecting a flash of light from the color patch and from a reference area on the sheet immediately adjacent the color patch to obtain signals which can be manipulated arithmetically in electrical circuitry to obtain the ratio. The use of a reference area immediately adjacent the color patch is disclosed in co-pending U.S. Application Ser. No. 79,952, filed Oct. 12, 1970, by John Michael Manring, which co-pending application is assigned to the same assignee as the present invention, to enable the convenient obtaining of reference light signals from the paper with the same flash of the light as is used to read the color patch to make the results independent of the intensity of light energy in the flash.

It is an object of the present invention to provide a high quality ink density measuring system which is such that image areas may readily be used as the color test area.

It is a further object of the present invention to provide a new and improved ink density measuring system in which the measurement of the amount of light reflected from a sheet and the measurement of the amount of light reflected by the ink whose density is to be measured can be made at different times and/or in different locations.

In accordance with a specific form of the preferred embodiment of the present invention, part of the image area is selected as the color test area for measuring the density of the ink whose density is to be measured. The area selected is a solid color area and the light reflected from this area is measured and compared with light reflected from a standard to form a first ratio. This ratio is then multiplied by a separate ratio which is obtained by measuring the light reflected from the standard and comparing it to the light reflected from the unprinted sheet. By multiplying these two ratios, the product will be the ratio of the light reflected from the color test area to the light reflected from the sheet to provide a measurement of ink density which is independent of variations in light intensity at the time the two measurements are taken.

Further objects and advantages of the present invention will be apparent from the following detailed description thereof made with reference to the accompanying drawings forming a part of the present specification for all subject matter disclosed therein and in which:

FIG. 1 is a side elevational view in schematic form of three cylinders of one color unit of a printing press;

FIG. 2 is a plan view of the impression cylinder of the printing unit shown in FIG. 1; and FIG. 3 is a schematic diagram of the densitometer circuitry.

The present invention is susceptible of use in a single color press or in a multi-color press as will be well understood by those skilled in the art.

In FIG. 1, a densitometer D, embodying the present invention, is shown associated with one printing unit which may be a single color unit or one unit of a multi-color press comprising a plate cylinder 7, a blanket cylinder 8, and an impression cylinder 10. The press illustrated is a sheet-fed press and, as is well understood, the sheet is printed between the impression and blanket cylinder and, as illustrated in FIG. 1, the sheet is transferred from the impression cylinder to a delivery cylinder 11 for delivery. The sheet being printed has been designated by the reference numeral 12 and is shown as having an image printed thereon which includes a solid color portion, designated by the reference numeral 13, which is to be used as a test area for measuring ink density for the color being printed. The densitometer for measuring the ink density includes a densitometer head 16 which is supported on a rod 18 for adjustment lengthwise, i.e., axially of the impression cylinder, so that the head may be properly positioned to read the selected color test area. The densitometer head includes a light source 38, preferably a Xenon gas discharge lamp, see FIG. 3, which may be flashed with a conventional condenser discharge circuit triggered by a signal to direct light onto the color test area. Conventional optics may be used to direct the light in a small beam to the test area and since these are well known to those skilled in the art, they have not been illustrated. The light reflected from the printed test area is sensed by a light measuring device 46 which will measure the amount of light reflected and provide an output signal over a line 48. The light from the flash lamp 38 is also directed through a baffle 40 about the light to a standard area 52. The standard area 52 is preferably a white patch and light reflected from this patch is measured by a light sensor 56 and an output is provided from the light sensor 56 over line 58 in accordance with light intensity received by the sensor 56.

In the illustrated embodiment, the lamp 38 is flashed when the cylinder is at an angular position where the densitometer may view the printed test area and again when the cylinder is in a position where the densitometer may view the unprinted test area.

To enable the flash lamp 38 to be flashed when any selected position about the cylinder is viewed by the densitometer, the impression cylinder is provided with a position encoder 34 which digitally indicates the angular position of the cylinder. A data register 60 is provided for storing a position number which corresponds to the angular position at which the printed test patch is to be viewed and a data register 72 stores a position number corresponding to the position at which the unprinted test area is to be viewed. As mentioned above, the densitometer head may be moved axially of the cylinder to enable any position axially thereof to be viewed as desired.

The number stored in the data register 60 and the number stored in the data register 72 are compared with the position from the position encoder 34 by comparator circuits 62, 74 corresponding to the data register 60 and the data register 72, respectively. When a comparison is made, an output signal appears on an output from the corresponding comparator circuit. The outputs of the comparator circuits 62, 74 are applied through an OR gate 68 to activate a firing circuit 70 for triggering a flashing of the lamp 38 and a gating on of the densitometer circuitry 57 for a period to measure the intensity of the light reflected from the area being viewed and from the standard patch area 52. The register 60 is set to a position number such that the light flashes when the densitometer head is viewing the selected printed area and the register 72 is set to a position number so that the light flashes when the densitometer head is viewing the selected unprinted area.

The outputs of the sensors 46, 56 are applied to densitometer circuitry indicated by the reference numeral 57 to provide an output which is the logarithm to the base 10 of the ratio of the light intensity received by the sensor 46 to the light intensity received by the sensor 56. This circuitry is described in detail in the said copending Application Ser. No. 79,952 filed Oct. 12, 1970. This control circuit will not be described in detail in the present application. Suffice it to say that when the flash lamp 38 is flashed, the output of the sensors is gated into integrating circuitry and ratio circuitry to provide the indicated ratio.

In the illustrated embodiment, the signals from the comparator circuits 62, 74 also activate delay circuits 88, 89, respectively, for gating the output of the densitometer through gates 90, 91 to respective registers 93, 94 for storing the ratio value at the output of the densitometer. After a set of readings has been taken, the register 93 will have stored therein the ratio of the light received by the sensor 46 on the printed area to the light received by the sensor 56 from the standard while the register 94 will have stored therein the ratio of the intensity of the light received by the sensor 46 from the unprinted material to the light received by the sensor 56 from the standard. At the end of each revolution, the ratios in the registers 93, 94 are gated by AND gating 96, 97 activated by the position encoder 34 to a computing circuit 100 to obtain the logarithm of the dividend of the ratio whose log is stored in the register 93 divided by the ratio whose logarithm is stored in the register 94 to provide the log of the ratio of the reflectance of the printed area to the reflectance of the unprinted area. As will be apparent, this dividend may be obtained merely by subtracting the logarithms stored in the registers 93, 94.

The output of the computing circuit 100 may be compared with a reference and used to automatically control an inker in accordance with the signal or may be used by the operator to effect the necessary adjustments.

From the foregoing, it can be seen that the present invention enables a solid portion of the image to be viewed to determine ink density even though there is no white patch immediately adjacent the image to be used for comparison purposes. The circuit enables the test area and the paper to be looked at at different times to obtain the necessary measurements to form the ratio of light reflected from the test area to light reflected from the paper or the ink test area and the paper check area may be flashed simultaneously but at locations not immediately adjacent each other to provide signals compared with the signal from the test patch to form the ratios described above which are to be multiplied to obtain the measurement of ink density.

What is claimed is:

1. In an apparatus for measuring density of ink printed onto material comprising means for sequentially directing light to a printed area of the printed material having ink thereon whose density is to be measured and to an unprinted reference area of the material to reflect light from the material and means for simultaneously with the directing of light to the printed area and to the unprinted reference area directing light to a standard area to reflect light therefrom, means for detecting the light reflected from the printed area to provide a color signal and for detecting the light reflected from the unprinted reference area to provide a reference signal and simultaneously with said detecting of the light from the printed area and from the unprinted test area detecting light reflected from the standard area and establishing signals in accordance with the detected reflections which have magnitudes which are dependent upon the amount of light reflected, first means connected to said detecting means for multiplying the signal derived from the printed area with the signal derived simultaneously from the standard area and establishing a first electrical signal which is a function of the ratio of the light reflected from the printed area to the light reflected from the standard area and for multiplying the signal derived from the unprinted reference area with the signal derived simultaneously from the standard area to establish a second signal which is a function of the ratio of the light reflected from the unprinted reference area to the light reflected from the standard area and second multiplying means connected to said first multiplying means for receiving and multiplying the first and second signals to provide a resultant which is a function of the ratio of the reflectance of the printed area to the unprinted area as a measure of the ink density.

2. A method of measuring density of ink printed onto material comprising the steps of sequentially directing light to a printed area of the printed material having the ink thereon whose density is to be measured and to an unprinted reference area of the material to reflect light from the material, simultaneously with the directing of light to the printed area and to the unprinted reference area directing light to a standard area to reflect light therefrom, detecting the light reflected from the printed area to provide a color signal, detecting the light reflected from the unprinted reference area to provide a reference signal and simultaneously with said detecting of the light from the printed area and from the unprinted area detecting light reflected from the standard area and establishing signals in accordance with the detected reflections which have magnitudes which are dependent upon the amount of light reflected, combining the signal from the printed area with the signal obtained simultaneously from the standard area to provide a first electrical signal which is a function of the ratio of one to the other, combining the signal from the unprinted reference area with the signal obtained simultaneously from the reference area to provide a second electrical signal which is a function of the ratio of one to the other, and operating on said first and second signals to provide a resultant signal which is a function of the ratio of the reflectance of the printed area and the unprinted reference area as a measure of the ink density of the ink printed onto the material.

3. In an apparatus for measuring density of ink printed onto material comprising means for sequentially directing light from a light source to a printed area of the printed material having ink thereon whose density is to be measured and to an unprinted reference area of the material to reflect light from the material, first means for detecting the light reflected from the printed area to provide a color signal and for detecting the light reflected from the unprinted reference area to provide a reference signal, means for providing a standard signal simultaneously with providing said color signal and including second light detecting means for receiving light directed from said light directing means in such a manner that the received light varies in intensity essentially only in dependence upon the characteristics of the light source and providing a standard signal in accordance with the said amount of light received, first multiplying means connected to said first and second detecting means for multiplying the signal derived from the printed area with the simultaneously derived standard signal and establishing a first electrical signal which is a function of the ratio of the color signal to the standard signal and for multiplying the signal derived from the unprinted reference area with the simultaneously derived standard signal to establish a second signal which is a function of the ratio of the reference signal to the standard signal, and second multiplying means connected to said first multiplying means for receiving and multiplying the first and second signals to provide a resultant which is a function of the ratio of the reflectance of the printed area to the unprinted area as a measure of the ink density.

* * * * *